United States Patent [19]
Banker

[11] 3,896,762
[45] July 29, 1975

[54] COATING APPARATUS

[75] Inventor: Gilbert S. Banker, West Lafayette, Ind.

[73] Assignee: Purdue Research Foundation, West Lafayette, Ind.

[22] Filed: June 17, 1974

[21] Appl. No.: 479,890

Related U.S. Application Data

[63] Continuation-in-part of Ser. No. 422,679, Dec. 7, 1973, abandoned, which is a continuation-in-part of Ser. No. 316,037, Dec. 18, 1972, abandoned.

[52] U.S. Cl. ........................ 118/30; 34/58; 34/112; 118/50; 118/416; 118/426
[51] Int. Cl. .............................................. B05c 3/10
[58] Field of Search .......... 118/50, 52, 53, 50.1, 30, 118/416, 423, 426; 34/58, 110, 112, 132–134, 139

[56] References Cited
UNITED STATES PATENTS

| | | | |
|---|---|---|---|
| 774,935 | 11/1904 | Churchill | 118/50 |
| 2,203,572 | 6/1940 | Johnson | 118/50 UX |
| 3,192,891 | 7/1965 | Maehl | 118/50 X |
| 3,707,944 | 1/1973 | Grundon et al. | 118/50 |
| 3,768,280 | 10/1973 | Kannegiesser et al. | 118/50 X |

*Primary Examiner*—Morris Kaplan
*Attorney, Agent, or Firm*—Gerald D. Sharkin; Robert S. Honor; Walter F. Jewell

[57] ABSTRACT

A rotary immersion coating apparatus for pharmaceutical solid dosage forms in which the dosage forms are held about the circumference of the apparatus by individually orbiting and rotating vacuum tubes, such that as the apparatus rotates to pass the dosage form through a coating bath, the rotating vacuum tubes allow for even coating by the coating solution.

12 Claims, 3 Drawing Figures

COATING APPARATUS

This application is a continuation-in-part of application, Ser. No. 422,679, filed Dec. 7, 1973 now abandoned, which application is a continuation-in-part of application, Ser. No. 316,037, filed Dec. 18, 1972, now abandoned.

This invention relates to coating apparatus. More particularly, it relates to immersion coating apparatus and to the immersion coating of pharmaceutical solid dosage forms.

Pharmaceutical tablets are presently coated in revolving coating pans or by air suspension techniques e.g. fluidized bed. These operations either subject tablets to attrition, which results in broken tablets, or cause thinner or non-uniform coatings to be applied to non-spherical tablets, especially at the edges, the point of greatest attrition and greatest film stress.

To overcome tablet attrition per se, the hardness of the tablet may be increased. However, this results in a decrease in drug availability. Non-uniform coatings are detrimental to tablet stability since they do not provide a uniform barrier to the penetration of oxygen and/or water vapor.

To provide adequate protection at the corner boundaries of a tablet requires overcoating the tablet. Such overcoating often adversely affects drug availability especially with tablet coatings that release drug by diffusion through the coating, or by timed dissolution of the coating in the body.

Because of these short-comings of the prior art, coated tablets in general provide variable drug protection and the poorest overall drug availability of all dosage forms used, and represent the least reliable method of achieving timed or controlled drug release.

In addition to the above coating problems, some polymers of pharmaceutical interest for tablet coating which include vinyl polymers, such as polyvinylpyrrolidone or poly (methyl vinyl ether/maleic anhydride) and derivatives thereof, have a low glass transition temperature or are inherently tacky, making these polymers very difficult or impossible to apply by conventional techniques in which the tablets contact one another during coating.

Pharmaceutical capsules in order to be conventionally coated, must first be banded at the juncture of the capsule closure, to prevent their coming apart during coating. Because this is an expensive and time consuming process, capsules in general are not coated, but rather the medicament particles within the tablets are coated.

It is therefore an object of this invention to provide a coating apparatus and method to overcome the prior art deficiencies in the coating of solid pharmaceutical dosage forms.

This and other objects of this invention will become apparent from the following detailed description and drawings wherein.

Like numerals in the figures depict like parts.

Broadly, this invention provides an apparatus and method for coating solid pharmaceutical dosage forms, whereby a rotary coating apparatus holding a dosage form by vacuum means immerses the dosage form in a coating solution to one-half or more of its total depth dimension, removes the dosage form from the coating solution, and dries it. Subsequently the dosage form is reversed with the coated portion held by the vacuum means and the uncoated portion immersed in the coating solution and dried to secure a completely coated dosage form.

Figure 1:
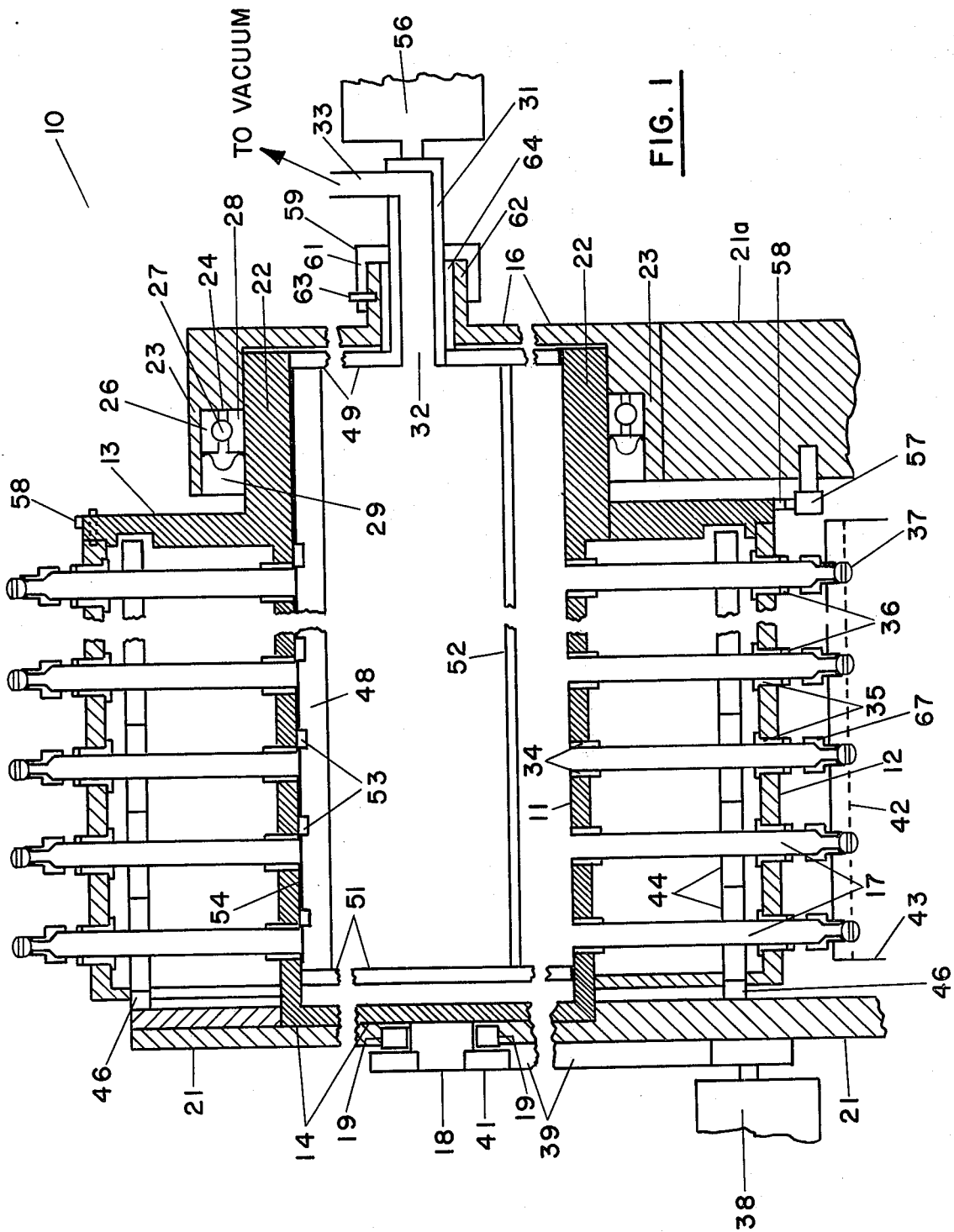
FIG. 1 is a sectional view of a coating device of this invention.

Referring now to FIG. 1, there is depicted at 10 a rotary coating apparatus of this invention. It comprises in combination an inner tube 11, an outer drum 12 and a circular adapter 13 to maintain inner tube 11 and outer drum 12 in a spaced apart fixed rigid relationship. The inner tube 11 is sealed to the atmosphere at its ends by end walls 14 and 16. Communicating with the inner tube 11, are vacuum tubes 17. These tubes 17 project through and extend beyond the outer drum 12. The coating apparatus 10 is rotatable about its axis by means of shaft 18, which is secured to end wall 14. Shaft 18 is rotatably mounted in bearing 19, which is mounted on frame 21.

The circular adapter 13 is provided with a flange 22 which is rotatably mounted in a circular bearing housing 23. Within the bearing housing is a circular bearing unit 24, having in combination, an upper race 26, bearings (e.g. ball bearings) 27 and a lower race 28. As the shaft 18 is rotated, flange 22 is communicatively supported by the lower race 28 and rotates upon the bearings 27. The upper race 26 is stationary against the bearing housing. The bearing housing 23 is provided with an air tight seal 29, and is supported by frame 21a.

Communicating with the interior of inner tube 11 is a hollow shaft 31, having on orifice 32 which orifice is beyond wall 16 and opens to the interior of inner tube 11. The end of shaft 31 opposite orifice 32 terminates in conduit 33, which conduit is communicatively connected to a vacuum activating system (not shown). Shaft 31 is preferably on the horizontal axis of the coating apparatus 10, and is normally non-rotatable during the rotation of the coating apparatus 10.

The vacuum tubes 17 are preferably rotatable about their longitudinal axis and are held in place by bearing seal 34 on the inner tube, bearing seal 35 on the inner surface of the outer drum, and a spring retaining ring 36 on the outer surface of the outer drum. Seal 34 is an air tight seal. The retaining ring maintains all the vacuum tubes in the same relative position on the coating apparatus. The vacuum tubes 17 are open into the inner tube 11 and extend beyond outer drum 12.

Although only one row of five vacuum tubes 17 is illustrated it is understood that more or less than five tubes may be used per row depending on drum length, and the number of rows is basically limited by the diameter of the rotary apparatus 10.

Figure 2:
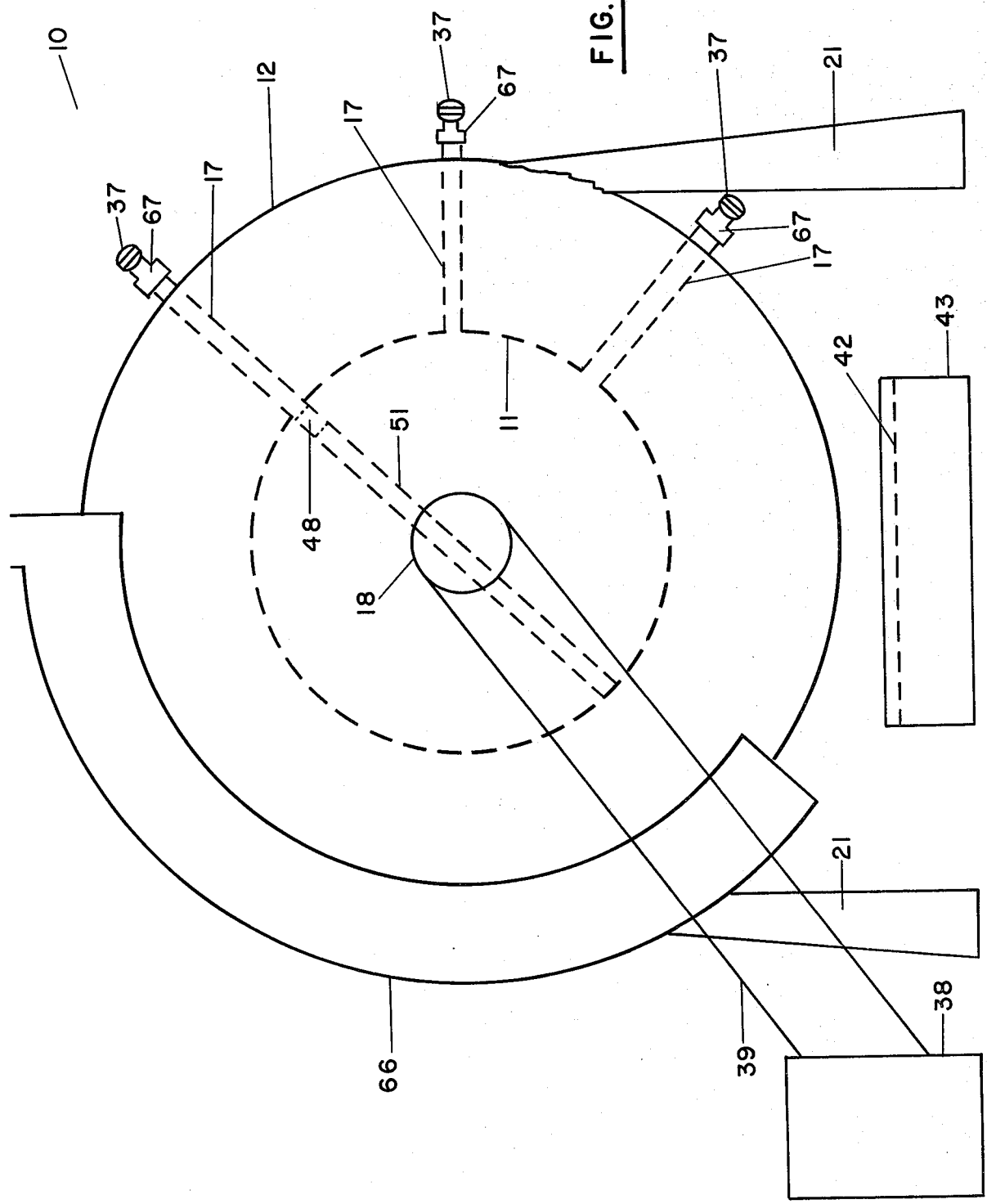
FIG. 2 is an end view of a coating device of this invention.

In the operation of the coating apparatus of this invention, inner tube 11 is placed under vacuum by a vacuum system (not shown) via extension 33, shaft 31, and orifice 32. The tablets or capsules 37 (tablets are illustrated) are secured to the external tip of vacuum tubes 17 by means of the vacuum in the inner tube 11. The coating apparatus 10 is rotated by means of motor 38, drive belt 39 and shaft pulley 41. As the apparatus rotates, the tablets 37 are brought into contact with the coating solution (the surface of which is shown by broken lines 42) in reservoir 43, see FIG. 2. As the coating apparatus rotates, the tablets or capsules 37 enter and leave the coating solution 42 at an angle to the horizontal solution surface. The rotation of the coating apparatus also actuates drive gears 44 which rotate the vacuum tubes 17. The vacuum tubes 17 are axially disposed through the center of each gear 44, and may be affixed to the gear by means of a pin or screw. The gears 44 are driven by engagement with a stationary circular face gear 46, which is affixed to frame 21. Each gear 44 engages its neighboring gear and thus all the gears in a given tube 17 row are interconnected. When the gear 44 adjacent the circular face gear 46 is rotated by the face gear, all of the gears 44 are thus simultaneously rotated. The rotation of vacuum tubes 17 causes the tablets or capsules 37 to also rotate, which motion enables the tablets or capsules to be evenly coated without the coating solution being drawn to the lowest part of the tablet or capsule as it leaves the coating solution.

As the apparatus 10 rotates, each of the vacuum tubes 17 engages a vacuum shut-off bar 48. The vacuum shut-off bar is within the inner tube 11 and slidably engages the inner circumferential surface of the tube as the tube rotates. It is affixed at one end by means of brace 49 to the portion of the hollow shaft 31 which protrudes into the inner tube. At the other end, the shut-off bar is supported by a brace 51. Both braces 49 and 51 are interconnected by a cross brace 52, across the inner tube opposite from the shut-off bar. The vacuum shut-off bar has on its inner tube engaging surface a plurality of notches 53. The horizontal dimension of each notch corresponds to the diameter of the vacuum tubes 17. As a row of vacuum tubes passes over the vacuum shut-off bar, vacuum is still maintained in the tubes via the notches 53, which notches match the number and location of the vacuum tubes. When the row of vacuum tubes is aligned with the notches of the shut-off bar, the bar is rapidly actuated to move the notch away from the corresponding vacuum tube and to position the upper inner tube engaging bar surface 54 over the vacuum tube. Thus the vacuum tubes are then rapidly cut off from the vacuum in the inner tube (as shown in FIG. 1, the shut off bar 48 is in the cut-off position). With the vacuum to the tablets or capsules shut off, they are thus able to be removed from the coating device.

The vacuum shut-off bar is actuated by an air cylinder 56, which is affixed to the external end of shaft 31. When the notches 53 on the vacuum shut-off bar are aligned with the vacuum tubes, the air cylinder moves the shaft 31 and the interconnected shut-off bar to position the upper bar surface 54, over the vacuum tubes and thus shut-off the vacuum to the vacuum tubes.

The air cylinder 56 is actuated by a switch 57 via a conventional connection not shown. The switch is in communication with a sensor e.g. groove, notch or tab 58 on the outer drum 12, which is syncronized with the vacuum shut-off bar, such that when the shut-off bar is in position to shut off the vacuum to the vacuum tubes, the tab actuates the switch which in turn actuates the air cylinder.

The vacuum shut-off bar 48 is normally secured at a fixed position on the inner circumference of the inner tube 11 during the rotation of the coating apparatus, by means of a rotational lock assembly 59. A lock collar 61, of the assembly, engages a stationary flange 62 of the end wall 16 and is communicatively secured to the flange by an anti-rotational key 63. When the vacuum shut-off bar is to be repositioned within the inner tube, the key 63 is removed and the collar 61 disengaged from the flange 62. Shaft 31 (to which the vacuum shut-off bar is affixed) is then turned on bearing 64 to move the shut-off bar to its new position. To lock the shut-off bar in position, the above procedure is reversed. The bearing 64 (e.g., bronze) also supports the reciprical movement of shaft 31 when it is moved by the air cylinder 56 to actuate the vacuum shut-off bar. Bearing 64 is also a vacuum seal for the inner tube 11.

In a preferred embodiment of the invention, the shut off bar 48 is provided with an internal air tube (not shown) which communicates at one end with an air source, e.g., air pump, and also communicates with points on the upper bar surface 54 thereof in between the notches 53, which points come into alignment with the vacuum tubes 17 when the shut off bar is actuated to bring the notches 53 out of alignment with the vacuum tubes 17. In this way, the tubes are not only cut off from the vacuum but are also connected to an air source, thus facilitating removal of the coated articles. The air source may be set (by means known in the art) to provide air to the internal air tube only when the upper bar surface 54 is in alignment with the vacuum tubes 17.

In a preferred embodiment of the coating apparatus of this invention a single vacuum drum may be used in place of the combination of an inner tube 11 and an outer drum 12 described above.

Figure 3:
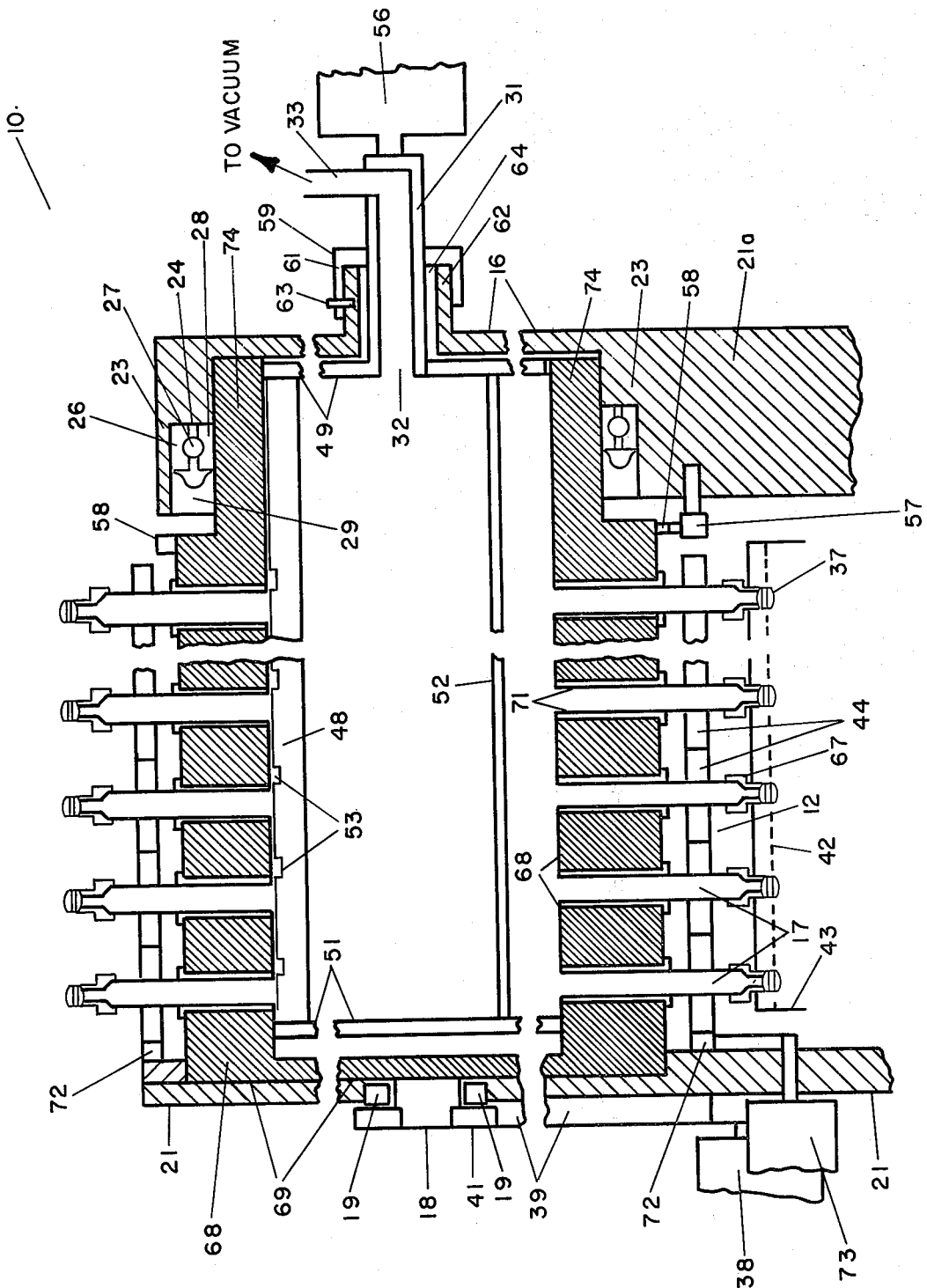
FIG. 3 is a sectional view of a preferred embodiment of a coating device of this invention.

FIG. 3 depicts this embodiment wherein a vacuum drum 68 is shown in combination with other above described structure and features of the invention. The drum 68 is sealed to the atmosphere by end walls 16 and 69. The vacuum tubes 17 are in communication with interior of the drum 68 and function in the manner described above. Similarly, the structure and functions of the drive mechanism, the bearing supports, the vacuum system, and the vacuum shut-off bar 48 mechanism are the same as previously described. Flange 74 of the vacuum drum 68 functions in the same manner as flange 22 of FIG. 1 and is rotatably mounted within the circular bearing housing 23.

The thickness of the vacuum drum 68 is not critical but should be sufficient to provide a support for the vacuum tubes 17. These tubes are held in place by a bearing seal 71, a flange or a ring on the vacuum side of drum 68, and a drive gear 44 retaining pin or screw on the outer surface of the drum 68. The vacuum tubes 17 are rotated by the drive gears 44 by engagement with a face gear 72 which gear may be rotated independent of the single tube 68. The face gear 72 is rotatably mounted on frame 21 by conventional means. A conventional drive mechanism 73 (e.g., variable speed motor and transmission) may be linked to the face gear 72 to rotate it. It is therefore possible to alter the rotational speed of the vacuum tubes 17 independent of the rotational speed of drum 68. The face gear 72 may be rotated at a speed slower, the same as, or faster than the rotational speed of drum 68. The gear 72 may also be rotated in the opposite direction of the rotation of drum 68.

Apparatus 10 may have affixed to it a drying chamber 66 (See FIG. 2), wherein the tablets or capsules which have been coated are dried prior to removal from the coating apparatus. The drying chamber may be of the air circulation type (as illustrated) or it may contain heating elements, such as lamps, wires, infrared, microwave or other electronic means to evaporate the solvent from the tablet coating. While the drying chamber is not shown in FIG. 1 and FIG. 2, it is understood that it would cover the length of the coating apparatus.

Pharmaceutical tablets or capsules are normally prepared in a variety of sized due to variations in the drug content of a tablet. To accommodate tablets or capsules of various sizes, the vacuum tubes have removable tips 67. These tips have tablet or capsule engaging surfaces and engage the vacuum tubes. They may be easily changed to accommodate the size of the tablet or capsule to be coated.

While the apparatus herein disclosed and described constitutes a preferred form of the invention, it is also to be understood that the apparatus is capable of mechanical alteration without departing from the spirit of the invention and that such mechanical arrangement and commercial application as fall within the scope of the invention are intended to be included herein.

What is claimed is:

1. A rotary coating apparatus comprising in combination, a frame, an inner tube and an outer drum rotatably mounted on the frame, an adaptor means maintaining the inner tube and outer drum in spaced-apart rigid relationship, end walls sealing the inner tube to the atmosphere, vacuum means communicating with the inner tube through one of the end walls, a plurality of rows of vacuum tubes, in vacuum sealed communication with the inner tube and projecting through and in communication with the outer drum, the vacuum tubes being in vacuum sealed rotatable communication with the inner tube and in rotatable communication with the outer drum, the vacuum tubes being affixed to a plurality of interconnected gears, which gears are in engagement with a stationary gear on the frame, whereby to effect the rotatable movement of the vacuum tubes, a vacuum shut-off means in slidable engagement with the inner surface of the inner tube, and means to move the shut-off means whereby to select either shut-off or establish vacuum communication between the inner tube and the vacuum tubes at a predetermined time during the apparatus rotation.

2. The rotary coating apparatus of claim 1 wherein the vacuum shut-off means has on its inner tube engaging surface a plurality of notches corresponding to the number and position of the vacuum tubes, whereby to establish said vacuum communication between the inner tube and the vacuum tubes.

3. The rotary coating apparatus of claim 2 wherein locking means are adapted to position the vacuum shut-off means at any desired position on the inner surface of the inner tube.

4. The rotary coating apparatus of claim 3 wherein an internal air tube in the shut-off means communicates with the inner tube engaging surface of the shut-off means and an external air source.

5. The rotary coating apparatus of claim 4 wherein removable tips adapted to receive pharmaceutical dosage forms are engaged on the vacuum tubes.

6. The rotary coating apparatus of claim 5 wherein a drying chamber is affixed to the apparatus.

7. A rotary coating apparatus comprising in combination, a frame, a vacuum drum rotatably mounted on the frame, end walls sealing the vacuum drum to the atmosphere, vacuum means communicating with the vacuum drum through one of the end walls, a plurality of rows of vacuum tubes in vacuum sealed rotatable communication with the vacuum drum, the vacuum tubes being affixed to a plurality of interconnected gears, which gears are in engagement with a rotatable gear on the frame, whereby to effect the rotatable movement of the vacuum tubes, a vacuum shut-off means in slidable engagment with the inner surface of the vacuum drum, and means to move the shut-off means whereby to select either shut-off or establish vacuum communication between the vacuum drum and the vacuum tubes at a predetermined time during the apparatus rotation.

8. The rotary coating apparatus of claim 7 wherein the vacuum shut-off means has on its vacuum drum engaging surface a plurality of notches corresponding to the number and position of the vacuum tubes, whereby to establish vacuum communication between the vacuum drum and the vacuum tubes.

9. The rotary coating apparatus of claim 8 wherein locking means are adapted to position the vacuum shut-off means at any desired position on the inner surface of the vacuum drum.

10. The rotary coating apparatus of claim 9 wherein an internal air tube in the shut-off means communicates with the inner tube engaging surface of the shut-off means and an external air source.

11. The rotary coating appartus of claim 10 wherein removable tips adapted to receive pharmaceutical dosage forms are engaged on the vacuum tubes.

12. The rotary coating apparatus of claim 11 wherein a drying chamber is affixed to the apparatus.

* * * * *